United States Patent
Howard et al.

(10) Patent No.: US 6,658,329 B1
(45) Date of Patent: Dec. 2, 2003

(54) VIDEO GUIDANCE SENSOR SYSTEM WITH LASER RANGEFINDER

(75) Inventors: Richard T. Howard, Huntsville, AL (US); Albert S. (Nick) Johnston, Madison, AL (US); Michael L. Book, Huntsville, AL (US); Thomas C. Bryan, Huntsville, AL (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 34 days.

(21) Appl. No.: 10/138,887

(22) Filed: May 2, 2002

(51) Int. Cl.$^7$ .................................................. G06F 7/00
(52) U.S. Cl. ............................ 701/13; 701/1; 244/161; 356/141.1
(58) Field of Search ....................... 701/13, 1; 244/161, 244/158 R; 356/141.1, 141.2, 4.01, 152.01

(56) References Cited

U.S. PATENT DOCUMENTS

| | | | |
|---|---|---|---|
| 4,834,531 A | * 5/1989 | Ward | 356/5.08 |
| 5,100,229 A | * 3/1992 | Lundberg et al. | 356/3.12 |
| 6,091,345 A | 7/2000 | Howard et al. | |
| 6,465,787 B1 | * 10/2002 | Coulter et al. | 250/341.3 |

OTHER PUBLICATIONS

R. T. Howard, T. C. Bryan, M. L. Book; *The Video Guidance Sensor: Space, Air, Ground and Sea*; GN&C Conference; Nov. 2, 2000; 14 pages.

R.T. Howard, M.L. Book, T.C. Bryan; *Video–based Sensor for Tracking 3–Dimensional Targets*; Europto Conference; Sep. 28, 2000, 9 pages.

R.T. Howard, T.C. Bryan, M.L. Book, J. L. Jackson; *Active Sensor System for Automatic Rendezvous and Docking*.

\* cited by examiner

Primary Examiner—William A. Cuchlinski, Jr.
Assistant Examiner—Olga Hernandez
(74) Attorney, Agent, or Firm—James J. McGroary; Ross F. Hunt, Jr.

(57) ABSTRACT

A video guidance sensor system for use in automated docking of a chase vehicle with a target vehicle wherein the chase vehicle includes a laser rangefinder that uses pulse or phase time of flight measurement to measure distance. The laser rangefinder includes a diode laser pulse or phase driver that produces an output signal to a timing element and simultaneously operates a laser diode. The laser diode produces an intense light beam of a predetermined wavelength which is directed to retroreflectors that are positioned on a passive target. The laser rangefinder includes an avalanche photodetector that produces a corresponding output signal when detecting light reflected from the retroreflectors. The timing element measures a time interval between the output of the laser diode and the detection of light and supplies a corresponding output signal to a computer in order to determine the range of the target vehicle relative to the chase vehicle.

21 Claims, 2 Drawing Sheets

VIDEO GUIDANCE SENSOR SYSTEM WITH LASER RANGEFINDER

ORIGIN OF THE INVENTION

This invention was made by employees of the United States Government and may be manufactured and used by or for the Government for governmental purposes without the payment of any royalties.

FIELD OF THE INVENTION

The present invention relates to automated docking systems for space vehicles and, more particularly, the present invention relates to a video guidance sensor system for such docking system including a laser rangefinder for determining the range of a target vehicle relative to a chase vehicle.

BACKGROUND OF THE INVENTION

Prior techniques used in determining the range between two spacecraft vehicles for automatic rendezvous and docking of such, includes vehicle radar, man in loop estimates, global positioning systems, lasers, loran, and video guidance sensor systems for processing optical images in determining range. The video guidance sensor system approach, which is of particular importance here, is based on the concept of using captured and processed images to determine the relative positions and attitudes of a video guidance sensor and target. However, conventional video guidance sensor systems tend to be bulky, heavy, slow and demand higher power requirements.

One prior video guidance sensor system uses two lights of predetermined wavelengths to illuminate a target. The target includes a pattern of filtered retroreflectors to reflect light. The filtered retroreflectors pass one wavelength of light and absorb the other. Two successive pictures or images are taken of the reflected light and the two images are then subtracted one from the other, thereby allowing for target spots to be easily tracked. However, due to its size, weight, power requirements and speed, the prior art video guidance sensor system is of limited use in applications requiring fast tracking of moving objects. Such a system is described, for example, in R. Howard, T. Bryan, M. Book, and J. Jackson, "*Active Sensor System for Automatic Rendezvous and Docking*," SPIE Aerosense Conference, 1997, which is hereby incorporated by reference.

Another prior art video guidance sensor system uses a CMOS imaging chip and a digital signal processor (DSP) in order to provide higher-speed target tracking and higher-speed image processing. The faster tracking rates result in a more robust and flexible video guidance sensor. Because of these faster tracking rates, the video guidance sensor system can track faster moving objects or provide more data about slower moving objects. This video guidance sensor system is designed to be less complex, consume less power and volume and weigh less than previous systems. However, the video guidance sensor system is limited insofar as extended rangefinding and does not provide important backup capabilities nor an initial range estimate. Such a system is described, for example, in R. Howard, M. Book and T. Bryan, "*Video-based sensor for tracking 3-dimensional targets*," Atmospheric Propagation, Adaptive Systems, & Laser Radar Technology for Remote Sensing, SPIE Volume 4167, Europto Conference, September 2000, and in R. Howard, T. Bryan, and M. Book, "*The Video Guidance Sensor: Space, Air, Ground and Sea*," GN&C Conference, 2000, which are also hereby incorporated by reference.

SUMMARY OF THE INVENTION

In accordance with the present invention, a video guidance sensor system is provided for use in automated docking of a chase vehicle with a target vehicle, said system comprising: a passive target mounted on the target vehicle, said passive target including filtered retroreflectors for reflecting light received thereon; a video guidance sensor mounted on the chase vehicle, said video guidance sensor including: means for directing light of two predetermined wavelengths onto said filtered retroreflectors so that light of one wavelength reflected by said retroreflectors is received by said sensor; a camera for providing video images of the received light and producing a corresponding video output signal; a signal processing unit, connected to the camera, for receiving and processing said video output signal and for producing corresponding output signals; a computer for receiving said output signal from the signal processing unit, and for controlling operation of the chase vehicle based thereon so as to enable docking of the chase vehicle with the target vehicle; and a laser rangefinder, connected to said computer, for determining a range of the target vehicle relative to the chase vehicle and for supplying a corresponding range signal to said computer.

Preferably, the laser rangefinder includes a laser diode for producing laser light of the proper wavelength directed at said passive filtered target and an avalanche photodetector for receiving light reflected by said passive target and producing a corresponding output signal.

Advantageously, the laser rangefinder includes a diode laser pulse driver, electrically connected to said signal processing unit and to said laser diode, for providing a driver output signal for driving said laser diode.

Preferably, the laser rangefinder includes a wide-angle lens disposed in front of said laser diode for providing wide angle illumination of said passive target, a filter disposed in front of an avalanche photodetector, the filter being tuned to a predetermined wavelength of said laser diode, and a wide angle lens disposed between said filter and said avalanche photodetector.

Advantageously, the laser rangefinder includes an operational amplifier for receiving said output signal from said avalanche photodetector and for providing a corresponding amplified output signal.

Preferably, said diode laser pulse driver further produces an output control signal and said laser rangefinder includes a timing unit for receiving said amplified output signal and said output control signal and for, responsive thereto, supplying an output signal to said computer for use in determining the range of the target vehicle relative to the chase vehicle.

Advantageously, said rangefinder further includes a timing unit for measuring a time interval between production of a light pulse by said laser diode and detection of light by the avalanche photodetector, and for supplying a corresponding output signal to said computer for use in determining the range of the target vehicle relative to the chase vehicle.

Advantageously, the video guidance sensor system further comprises a filter disposed in front of the avalanche photodetector, said filter being tuned to a predetermined wavelength of said laser diode.

Advantageously, the video guidance sensor system further comprises a turning mirror for receiving light reflected by said retroreflectors.

Preferably, the signal processing unit comprises a digital signal processor and the computer comprises a single board computer.

Advantageously, the video guidance sensor system further comprises a power converter for supplying power to said video guidance sensor.

Preferably, the video guidance sensor system includes a solar filter disposed in front of said camera.

Advantageously, the video guidance sensor system further comprises a plurality of laser drivers coupled to said signal processing unit for driving said plurality of laser diodes so as to produce light.

Preferably, one of said laser diodes operates at a predetermined wavelength rejected by the retroreflector filter and a further one of said laser diodes operates at a predetermined wavelength accepted by the retroreflector filter.

Advantageously, the laser range finder comprises a computer, a modulator means for modulating the laser light produced by said laser diode and for producing a corresponding modulation frequency signal to said computer, an avalanche photodetector means for detecting said laser light and for producing a first phase signal, a phase detector for comparing said first phase signal and a further phase signal from said photodetector related to the light reflected by said passive target and for producing a corresponding relative phase signal based thereon, said computer determining the range of the target vehicle relative to the chase vehicle based on said modulation frequency signal and said relative phase signal.

Further features and advantages of the present invention will be set forth in, or apparent from, the detailed description of preferred embodiments thereof which follows.

DETAILED DESCRIPTION OF THE INVENTION

Figure 1:
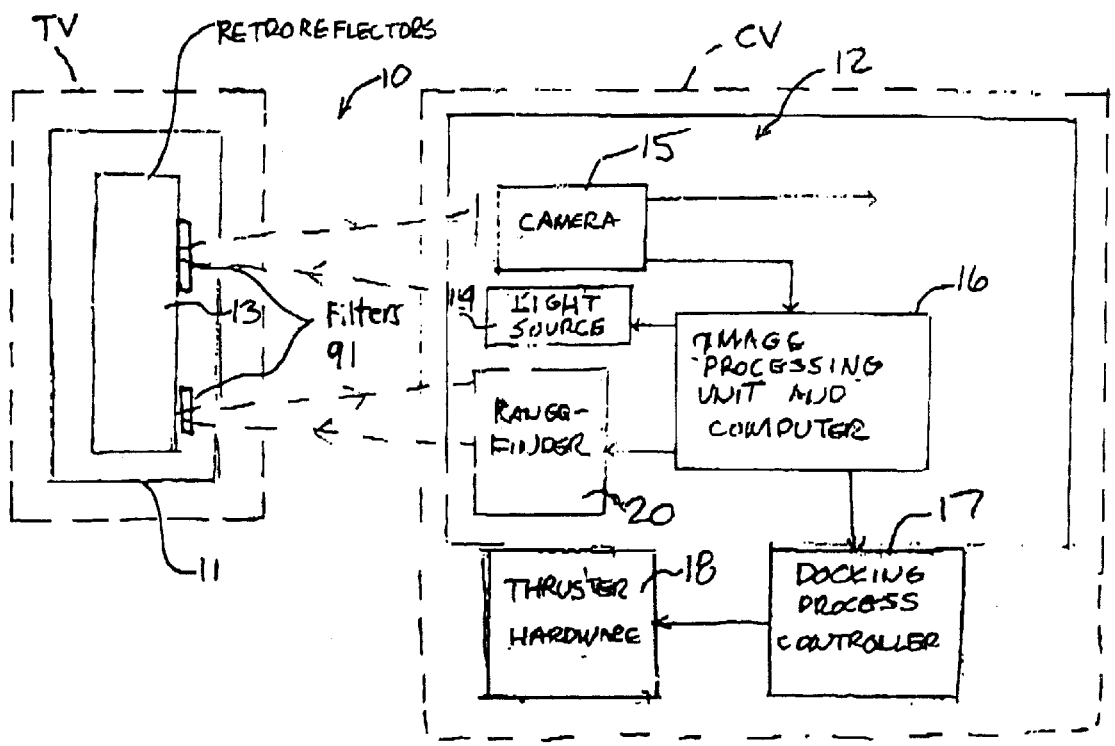
FIG. 1 is a block diagram showing the basic components of a space vehicle docking system incorporating a video guidance sensor system in accordance with a preferred embodiment of the invention.

Referring to FIG. 1, there is shown, in block diagram form, a video guidance sensor system for providing automated docking of a chase vehicle CV with a target vehicle TV. The video guidance sensor system, which is generally denoted 10, includes a passive target 11 mounted on the target vehicle TV. The passive target 11 includes long and short range targets including retroreflectors 13 for reflecting light received thereon and filters 91 for rejecting light at one wavelength and accepting the other wavelength of the light sources on the chase vehicle. The video guidance sensor system 10 further comprises a video guidance sensor 12 mounted on a chase vehicle CV. The video guidance sensor 12 includes a light source 14 for directing light onto the retroreflectors 13 and a camera 15 for capturing light reflected from the retroreflectors 13 and providing video images of the reflected light. The video guidance sensor 12 also includes a signal processing unit and computer 16 connected to receive an output signal from camera 15 and further connected to supply an output signal to a docking process controller 17 which controls thruster hardware 18. It will be appreciated that the portion of FIG. 1 described so far is completely conventional. A system of this type is described, for example, in U.S. Pat. No. 6,091,345 to Howard et al, which patent is hereby incorporated by reference.

In accordance with the invention, the video guidance sensor system 10 further comprises a laser rangefinder 20 that uses pulse time of flight measurement to determine the distance of the target vehicle TV relative to the chase vehicle CV. As described in more detail below, the laser rangefinder 20 provides an initial range estimate and verifies range data obtained by the video guidance sensor 12.

Figure 2:
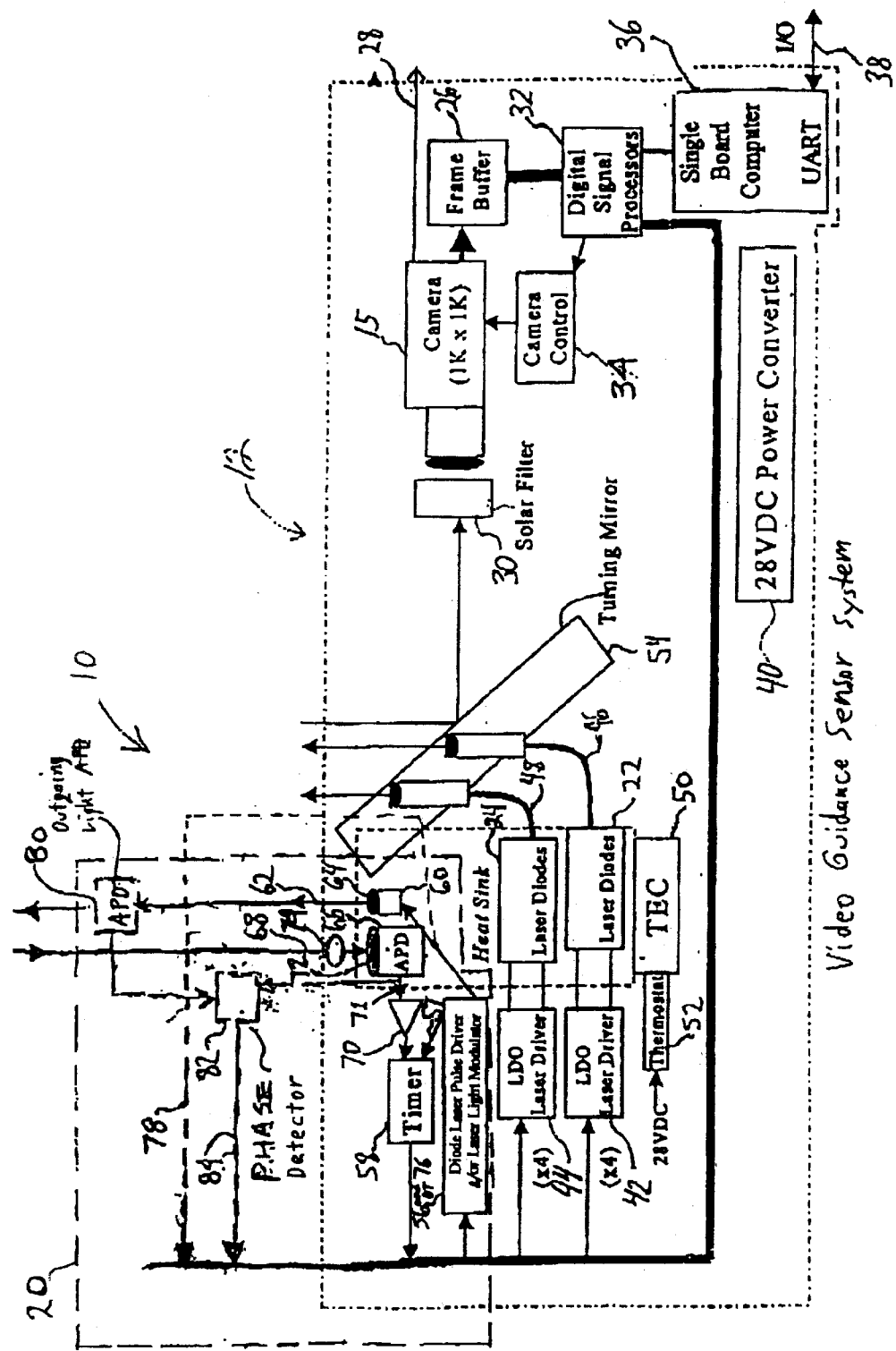
FIG. 2 is a block diagram of the video guidance sensor system of FIG. 1 illustrating a preferred embodiment thereof.

A preferred embodiment of a video guidance sensor system incorporating a laser rangefinder 20 is shown in FIG. 2. In general, the basic video guidance sensor 12 operates by sequentially firing two different wavelengths of laser diodes 22 and 24 at target 11, which includes retroreflectors 13, as described above in connection with FIG. 1. Camera 15 captures light reflected from the retroreflectors 13 and provides video images to a frame buffer 26 for holding a bit-map picture. In front of the camera 15 is disposed a solar-rejection filter 30 that passes light at predetermined wavelengths while rejecting all other wavelengths.

A signal processing unit 32 is electrically connected to the camera 15 via the frame buffer 26. The signal processing unit 32 receives an output signal from the frame buffer 26 and processes two images. More specifically, the signal processing unit 32 subtracts a received background image from a received foreground image and subsequently further subtracts a threshold image. The result is a low-noise image that is processed to find target spots. Because the physical dimensions of the target 11 are known, the relative positions and attitudes of the target 11 can be computed from the target spots. The signal processing unit 32 also provides an electronic signal to camera control electronics 34 in order to control the sync signals of the camera 15.

The signal processing unit 32 communicates with a computer 36. It will be appreciated that signal processing unit 32, computer 36 and the associated units described above basically correspond to image processing unit and computer 16 of FIG. 1. The computer 36 basically acts as a system controller to handle various functions such as data management, system status, and system diagnostics, and controls the operation of the chase vehicle CV so as to enable docking of the chase vehicle CV with the target vehicle TV. The computer also includes input/output lines 38 in order to provide serial communication. A 28 VDC power converter 40 supplies power to various components of the video guidance sensor 12 including electronic cards and temperature sensors. It will be appreciated that the signal processing unit 32 can be a digital signal processor or microprocessor and that the computer 36 can be a single-board computer.

The video guidance sensor 12 also includes a plurality of laser diode drivers 42 and 44 connected to computer 36 for driving the laser diodes 22 and 24. The computer 36 controls the sequential operation of the laser diodes 22 and 24, via the laser diode drivers 42 and 44, respectively. In addition, the computer 36 coordinates the operation of the laser diodes 22, 24 with the capturing and processing of the corresponding data images provided from the frame buffer 26. The laser diodes 22 and 24 operate at different predetermined wavelengths and, in an exemplary embodiment, these wavelengths are 808 nm and 850 nm. The laser diodes 22, 24 are fiber-optically coupled by fiber optic connections 46, and 48 so as to allow the laser outputs to be grouped near the lens of camera 15. More specifically, the fiber optic coupling provided by connections 46, 48 enables the outputs of the laser diodes 22, 24 to be positioned as near to the bore of the sight of the camera 15 as possible without interfering with the field-of-view (FOV) of camera 15. There is physically disposed under the laser diodes 22, 24 a thermo-electric cooler (TEC) 50 and associated thermostats 52 which are used to keep the laser temperatures within their operating range.

A turning mirror 54 is disposed at a 45 degree angle in front of the camera 15 in order to reduce the minimum operating range of the video guidance sensor system 10 while maintaining the same target configuration, field-of-view and operating speed. The video guidance sensor system 10 of FIG. 2 as described thus far basically corresponds to the video guidance sensor system described in the aforementioned article by R. Howard, M. Book and T. Bryan, "Video-based sensor for tracking 3-dimensional targets," Atmospheric Propagation, Adaptive Systems, & Laser Radar Technology for Remote Sensing, SPIE Volume 4167, Europto Conference, September 2000, which is hereby incorporated by reference.

As described above in connection with FIG. 1, the video guidance sensor system 10 of FIG. 2 also includes laser rangefinder 20. One function of the laser rangefinder 20 is to form an initial estimate of the distance to the target vehicle TV.

The laser rangefinder 20 includes a diode laser pulse driver 56 which is electrically connected to the signal processing unit 32. The diode laser pulse driver 56 provides a control signal 57 to a timing unit or element 58 and simultaneously controls a laser diode 60. The laser diode 60 produces an intense light beam 62 of a predetermined wavelength which is directed to the passive target 11 and reflected by the retroreflectors 13, as described above in connection with FIG. 1. A wide-angle lens 64 is disposed in front of the laser diode 60 so that the light from laser diode 60 illuminates the entire field-of-view.

An avalanche photodetector 66, which is sensitive to very dim light, receives the light 68 reflected from the retroreflectors 13 of the passive target 11 and produces a corresponding output signal 71 to an operational amplifier 70. A lens 72 is disposed in front of the avalanche photodetector 66. The lens 72 allows the avalanche photodetector 66 to cover a desired sensor field-of-view, i.e. a wide angle of viewing to match the wide angle illumination. An optical filter 74 is disposed in front of the avalanche photodetector 66, between the lens 72 and the reflected light 68. The optical filter 74 is finely tuned to a predetermined wavelength of the laser diode 60.

The timing unit 58 receives both the amplified output signal from the operational amplifier 70 and the control signal 57 from the diode laser pulse driver 56. The timing unit 58 measures the time interval between initial pulsing of the laser diode 60 and detection of light by the avalanche photodetector 66. This time interval is related to the current distance between target vehicle TV and chase vehicle CV. The timing element 58 supplies a corresponding output signal to the computer 36 via the signal processing unit 32.

The computer 36 processes the signals received from the signal processing unit 32 and determines the distance of the target vehicle TV relative to the chase vehicle CV. The computer 36 can also determine, from the modulation frequency signal 78 and the phase signal 82, the range of the target vehicle. It will be appreciated that determining the range from the modulation frequency signal 78 and the phase signal 82 provides better range resolution.

The computer 36 also verifies the range data obtained by the video guidance sensor 12. The laser rangefinder 20 provides range information and the video guidance sensor 12 provides bearing information until the video guidance sensor 12 and target vehicle TV are close enough for the chase vehicle CV to acquire, i.e. dock with, the target vehicle TV. The laser rangefinder 20 can also be used as a back-up system in the event of a failure of the video guidance sensor 12.

In an alternative embodiment indicated in dashed lines in FIG. 2, a phase modulator 76 is provided for modulating the laser light 62 and for providing a corresponding modulation frequency signal 78 to the computer 36 via the signal processing unit 32. In addition, an avalanche photodetector 80 is provided to measure the output laser light 62. A phase detector 82 receives an output signal from avalanche photodetector 80 as well as an output signal from photodetector 66 and produces an output signal 84 based on the relative phase of the outgoing laser light 62 and returning laser light 68. The output signal 84 is also supplied to computer 36 via the signal processing unit 32. Computer 36 computes the range based on the modulation frequency of the laser modulator 76 and the relative phase of the outgoing light 62 and returning light 68.

Although the invention has been described above in relation to preferred embodiments thereof, it will be understood by those skilled in the art that variations and modifications can be effected in these preferred embodiments without departing from the scope and spirit of the invention.

What is claimed is:

1. A video guidance sensor system for use in automated docking of a chase vehicle with a target vehicle, said system comprising:
    a passive target mounted on the target vehicle, said passive target including filtered retroreflectors for reflecting light received thereon;
    a video guidance sensor mounted on the chase vehicle, said video guidance sensor including:
        means for directing light onto said retroreflectors so that one wavelength of light reflected by said retroreflectors is received by said sensor;
        a camera for providing video images of the received light and producing a corresponding video output signal;
        a signal processing unit, connected to the camera, for receiving and processing said video output signal and for producing corresponding output signals; and
        a computer for receiving said output signal from the signal processing unit, and for controlling operation of the chase vehicle based thereon so as to enable docking of the chase vehicle with the target vehicle; and
    a laser rangefinder, connected to said computer, for determining the range of the target vehicle relative to the chase vehicle and for supplying a corresponding range signal to said computer.

2. A video guidance sensor system according to claim 1, wherein said laser rangefinder includes a laser diode for producing laser light directed at said passive target and an avalanche photodetector for receiving light reflected by said passive target and producing a corresponding output signal.

3. A video guidance sensor system according to claim 2, wherein said laser rangefinder includes a diode laser pulse driver, electrically connected to said signal processing unit and to said laser diode, for providing a driver output signal for driving said laser diode.

4. A video guidance sensor system according to claim 2, wherein said laser rangefinder includes a wide-angle lens disposed in front of said laser diode for providing wide angle illumination of said passive target.

5. A video guidance sensor system according to claim 2, further comprising a filter disposed in front of an avalanche photodetector, said filter being tuned to a predetermined wavelength of said laser diode.

6. A video guidance sensor system according to claim 5, further comprising a wide angle lens disposed between said filter and said avalanche photodetector.

7. A video guidance sensor system according to claim 3, wherein said laser rangefinder includes an amplifier for receiving said output signal from said avalanche photodetector and for providing a corresponding amplified output signal.

8. A video guidance sensor system according to claim 7, wherein said diode laser pulse driver further produces an output control signal and said laser rangefinder includes a timing unit for receiving said amplified output signals and said output control signal and for, responsive thereto, supplying an output signal to said computer for use in determining the range of the target vehicle relative to the chase vehicle.

9. A video guidance sensor system according to claim 2, wherein said rangefinder further includes a timing unit for measuring a time interval between production of a light pulse by said laser diode and detection of light by said avalanche photodetector, and for supplying corresponding output signals to said computer for use in determining the range of the target vehicle relative to the chase vehicle.

10. A video guidance sensor system according to claim 1, wherein said means for directing light onto said retroreflectors comprises a plurality of laser diodes.

11. A video guidance sensor system according to claim 1, further comprising a turning mirror for receiving light reflected by said retroreflectors.

12. A video guidance sensor system according to claim 1, wherein said signal processing unit comprises a digital signal processor.

13. A video guidance sensor system according to claim 1, wherein said computer comprises a single board computer.

14. A video guidance sensor system according to claim 1, wherein said laser rangefinder is electrically coupled to said computer via said signal processing unit.

15. A video guidance sensor system according to claim 1, further comprising a power converter for supplying power to said video guidance sensor.

16. A video guidance sensor system according to claim 1, including a solar filter disposed in front of said camera.

17. A video guidance sensor system according to claim 10, further comprising a plurality of laser drivers coupled to said signal processing unit for driving said plurality of laser diodes so as to produce light.

18. A video guidance sensor system according to claim 17, wherein each of said plurality of laser diodes operates at a predetermined wavelength.

19. A video guidance sensor system according to claim 18, wherein the predetermined wavelength of one of said laser diodes is rejected by the retroreflector filter.

20. A video guidance sensor system according to claim 19, wherein the predetermined wavelength of a further one of said laser diodes is accepted by the retroreflector filter.

21. A video guidance sensor system according to claim 2, wherein said laser rangefinder comprises a computer, modulator means for modulating the laser light produced by said laser diode and for supplying a corresponding modulation frequency signal to said computer, a photodetector means for detecting the output laser light amplitude and for producing a first signal to the phase detecctor, a phase detector for comparing said first signal and a further signal produced by a second photodetector and related to the amplitude of the light reflected by said passive target and for producing a corresponding relative phase signal based thereon, said computer determining the range of the target vehicle relative to the chase vehicle based on said modulation frequency signal and said relative phase signal.

* * * * *